(12) United States Patent
Dooley et al.

(10) Patent No.: US 9,127,596 B2
(45) Date of Patent: Sep. 8, 2015

(54) GAS TURBINE ENGINE FUEL CONTROL SYSTEM

(75) Inventors: Kevin A. Dooley, Mississauga (CA); Joseph Brand, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1106 days.

(21) Appl. No.: 13/091,301

(22) Filed: Apr. 21, 2011

(65) Prior Publication Data

US 2011/0192169 A1    Aug. 11, 2011

Related U.S. Application Data

(62) Division of application No. 11/668,762, filed on Jan. 30, 2007, now Pat. No. 7,950,216.

(51) Int. Cl.
  *F02C 9/28* (2006.01)
  *F02C 3/20* (2006.01)
  *F02C 9/40* (2006.01)

(52) U.S. Cl.
  CPC ... *F02C 9/28* (2013.01); *F02C 3/20* (2013.01); *F02C 9/40* (2013.01); *F05D 2270/31* (2013.01)

(58) Field of Classification Search
  CPC .............. F02C 3/20; F02C 9/28; F02C 9/40; F05D 2270/31; Y02T 50/678
  USPC .......................... 60/39.281, 39.463, 772, 773
  See application file for complete search history.

(56) References Cited

U.S. PATENT DOCUMENTS

| | | | |
|---|---|---|---|
| 3,875,380 A | 4/1975 | Rankin | |
| 4,369,803 A | 1/1983 | Furr | |
| 4,472,936 A | 9/1984 | Uchiyama et al. | |
| 4,486,148 A | 12/1984 | Battah | |
| 4,761,948 A | 8/1988 | Sood et al. | |
| 4,833,878 A | 5/1989 | Sood et al. | |
| 5,115,635 A * | 5/1992 | Jennings et al. | 60/773 |
| 5,259,186 A | 11/1993 | Snow | |
| 5,281,129 A * | 1/1994 | Urushidani et al. | 431/12 |
| 5,305,597 A | 4/1994 | Snow | |
| 5,325,836 A | 7/1994 | Orzel et al. | |
| 5,327,718 A * | 7/1994 | Iwata et al. | 60/773 |
| 5,555,719 A | 9/1996 | Rowen et al. | |
| 5,807,749 A | 9/1998 | Hornemann | |
| 5,882,115 A | 3/1999 | Vander Heyden | |

(Continued)

FOREIGN PATENT DOCUMENTS

| | | |
|---|---|---|
| EP | 0501313 | 9/1992 |
| EP | 1118857 | 7/2001 |

(Continued)

OTHER PUBLICATIONS

USPTO Non-final Office Action of Aug. 5, 2010 for U.S. Appl. No. 11/668,762.

(Continued)

*Primary Examiner* — Gerald L Sung

(74) *Attorney, Agent, or Firm* — Norton Rose Fulbright Canada LLP

(57) ABSTRACT

A fuel control system having a combustive energy value evaluator determining a combustive energy value of the fuel, and a controller calculating a desired flow rate based at least on the combustive energy value and controlling a fuel metering device such that the fuel flow rate corresponds to the desired fuel flow rate.

19 Claims, 2 Drawing Sheets

(56) References Cited

U.S. PATENT DOCUMENTS

| | | |
|---|---|---|
| 6,082,092 A | 7/2000 | Vandervort |
| 6,226,976 B1 | 5/2001 | Scott et al. |
| 6,257,174 B1 | 7/2001 | Huff et al. |
| 6,385,960 B1 | 5/2002 | Kress et al. |
| 6,405,522 B1 | 6/2002 | Pont et al. |
| 6,490,867 B2 | 12/2002 | Braun et al. |
| 6,609,378 B2 | 8/2003 | Scott |
| 6,640,548 B2 | 11/2003 | Brushwood et al. |
| 6,851,416 B1 | 2/2005 | DeWitte et al. |
| 7,334,391 B2 | 2/2008 | Sako et al. |
| 7,472,540 B2 * | 1/2009 | Berenbrink et al. ....... 60/39.281 |
| 2003/0131604 A1 | 7/2003 | Scott |
| 2004/0011050 A1 | 1/2004 | Inoue |
| 2005/0126178 A1 | 6/2005 | Rebhan et al. |
| 2006/0081230 A1 | 4/2006 | Kangler |
| 2008/0098746 A1 | 5/2008 | Iasillo et al. |
| 2008/0115482 A1 | 5/2008 | LaGrow et al. |
| 2009/0120054 A1 * | 5/2009 | Prade ........................... 60/39.3 |

FOREIGN PATENT DOCUMENTS

| | | |
|---|---|---|
| EP | 1500805 | 1/2005 |
| JP | 61040432 | 2/1986 |
| JP | 200230944 | 1/2002 |
| JP | 200436457 | 2/2004 |
| WO | 8808075 | 10/1998 |
| WO | 0052315 | 9/2000 |
| WO | 0140644 | 6/2001 |

OTHER PUBLICATIONS

European Search Report issued in Application No. EP08250360.8 on Jul. 21, 2011.

* cited by examiner

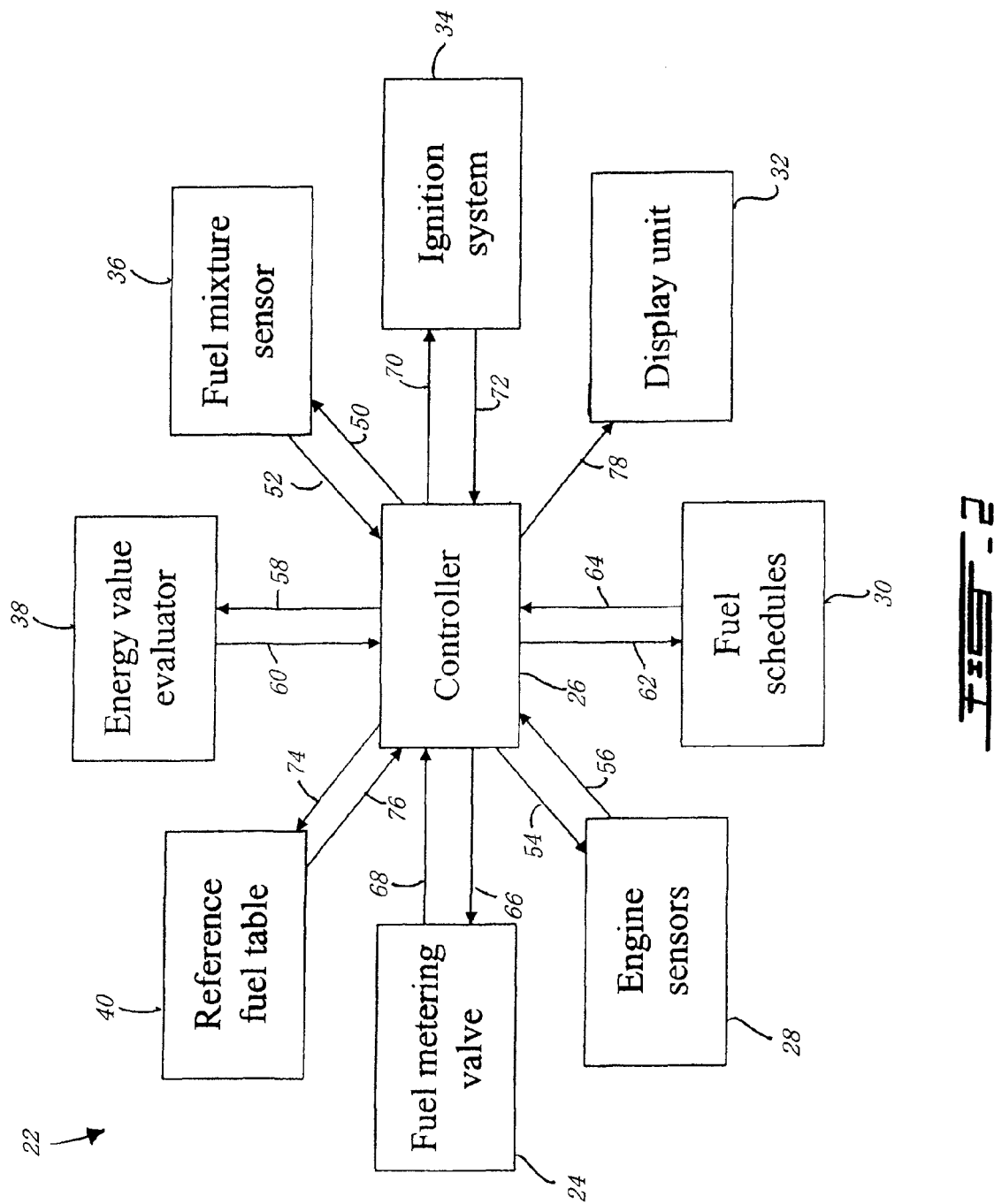

GAS TURBINE ENGINE FUEL CONTROL SYSTEM

CROSS-REFERENCE TO RELATED APPLICATIONS

The present application is a divisional of U.S. patent application Ser. No. 11/668,762 filed Jan. 30, 2007 now U.S. Pat. No. 7,950,216, the entire content of which is incorporated herein by reference.

TECHNICAL FIELD

The invention relates generally to gas turbine engines and, more particularly, to an improved fuel control system thereof.

BACKGROUND

Gas turbine engines are generally adapted to be used with a single type of jet fuel, for example JP4 jet fuel. As such, use of a different fuel, for example ethanol, in these engines can be detrimental to the engines' performances, as the fuel flow in the engine is usually controlled through a series of fuel schedules established for a specific type of fuel and as such not adapted for other types of fuel of mixtures thereof.

With the rise of fuel costs, some areas of the world may choose to use Ethanol or mixtures of Ethanol in Jet fuel, accepting a reduced flight range for the cost savings. However, refueling with a fuel that may be different from the fuel already contained in the tank can cause the precise equivalent content of the fuel tanks to be unknown. A pilot who is confused as to the exact type of fuel contained in the fuel tanks can be mistaken upon calculation of the range of the aircraft. This can be hazardous, especially in cases where the range is overestimated.

Accordingly, there is a need to provide an improved fuel control system and/or method for a gas turbine engine.

SUMMARY

In one aspect, the present invention provides a method of controlling a flow of a fuel in a gas turbine engine comprising sensing at least one characteristic of the flow, determining a combustive energy value of the fuel based on the at least one characteristic, determining a desired fuel flow rate at least based on the combustive energy value, and controlling a fuel metering device of the engine to obtain the desired fuel flow rate.

In another aspect, the present invention provides a method of monitoring a flow of a fuel in a gas turbine engine comprising sensing at least one characteristic of the flow, determining a combustive energy value of the fuel based on the at least one characteristic, determining at least one equivalent characteristic of a reference fuel corresponding to the combustive energy value, and displaying the at least one equivalent characteristic.

In a further aspect, the present invention provides a fuel control system for a gas turbine engine comprising at least one sensor determining at least one characteristic of a fuel flow in the engine, a combustive energy value evaluator determining a combustive energy value of the fuel from the at least one characteristic, a fuel metering device metering a fuel flow rate in the engine, and a controller calculating a desired flow rate based at least on the combustive energy value and controlling the fuel metering device such that the fuel flow rate corresponds to the desired flow rate.

There is also provided, in accordance with another aspect of the present invention, a method of controlling a flow of a fuel mixture of different types of fuel in a gas turbine engine, the method comprising: determining a combustive energy value of an input of the fuel mixture in the engine; extracting fuel schedule data from a fuel schedule established for a reference fuel; determining a desired fuel mixture flow rate by adapting the fuel schedule data to the fuel mixture based on the combustive energy value; and controlling a fuel metering device of the engine such that the fuel mixture flow rate corresponds to the desired fuel mixture flow rate.

There is further provided, in accordance with another aspect of the present invention, a system for monitoring a flow of a fuel mixture of different types of fuel in a gas turbine engine, the system comprising: a unit determining a combustive energy value of the fuel mixture in the engine; a controller determining at least one equivalent characteristic of a reference fuel corresponding to the combustive energy value of the fuel mixture; and a display unit displaying the at least one equivalent characteristic.

There is further still provided, in accordance with yet another aspect of the present invention, a control system for a fuel mixture of different types of fuel in a gas turbine engine, the system comprising: a unit determining a combustive energy value of an input of the fuel mixture in the engine; and a controller extracting fuel schedule data from a fuel schedule established for a reference fuel, calculating a desired flow rate of the fuel mixture by adapting the fuel schedule data to the fuel mixture based on the combustive energy value, and outputting a signal adapted to control a fuel metering device of the engine such as to conform a fuel mixture flow rate to the desired flow rate.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2 is a schematic representation of a fuel control system according to a particular embodiment of the present invention.

DETAILED DESCRIPTION

Figure 1:
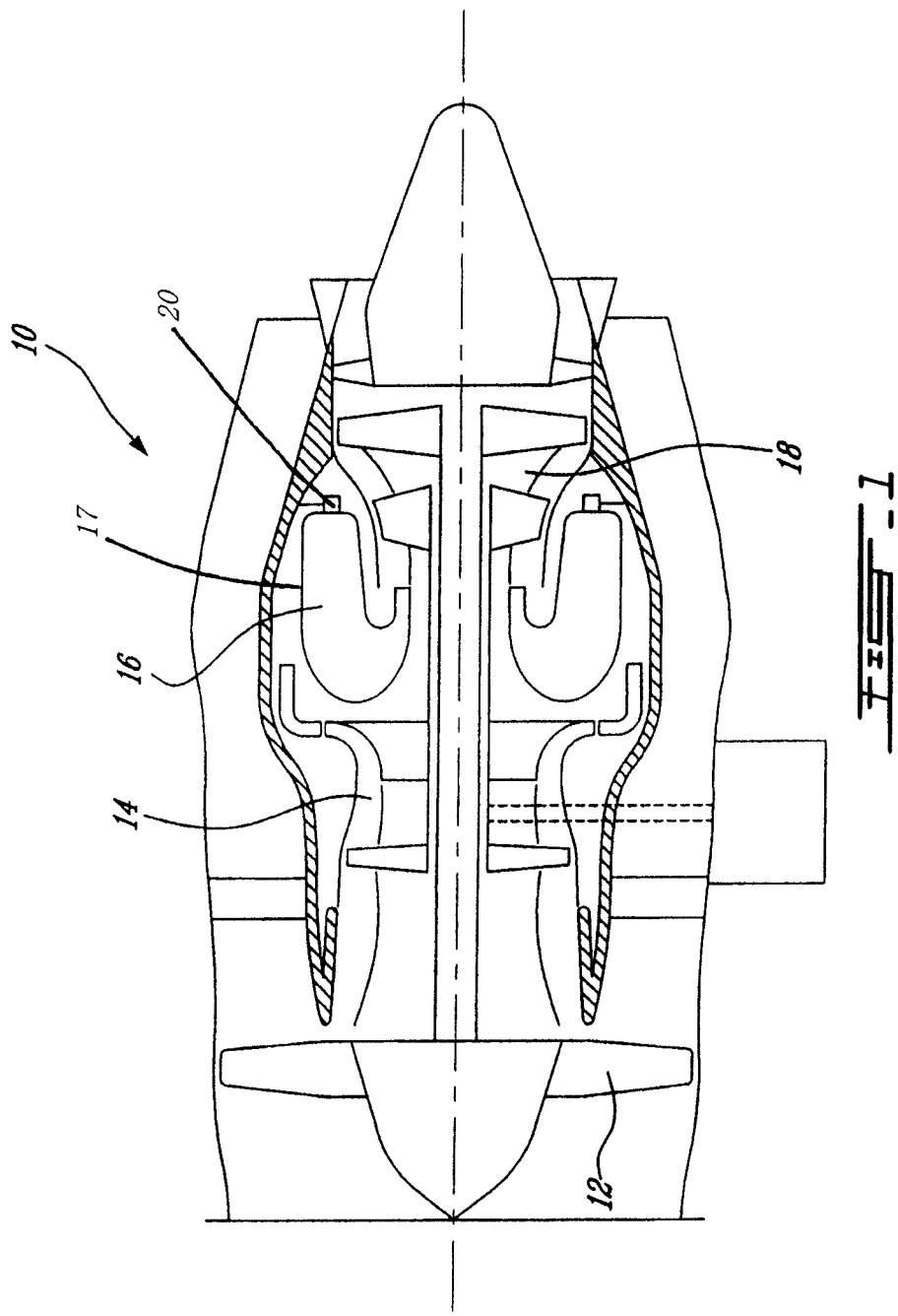
FIG. 1 is a schematic, cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustion section 16 in which the compressed air is mixed with fuel atomized into a combustion chamber 17 by a fuel injection system 20, the mixture being subsequently ignited for generating hot combustion gases before passing through a turbine section 18 for extracting energy from the combustion gases.

Referring to FIG. 2, the flow of fuel to the fuel injection system 20 is controlled by a fuel control system 22. The fuel control system 22 includes a fuel metering device 24 metering the fuel reaching the fuel injection system 20. The fuel metering device 24 is electrically controlled in a precise and predictable manner by a controller 26. In a particular embodiment, the controller 26 is part of the electrical and electronic engine control (EEC) (not shown) of the engine 10.

The controller 26 generally receives data from various engine sensors 28. This data includes pressure and temperatures at various points of a flow path of the engine 10, as well as fuel mass flow. Based on this data, the controller 26 refers to fuel schedules 30 both upon start-up of the engine 10 and once the engine 10 is lit, to determine a desired fuel flow and control the fuel metering device 24 accordingly. The fuel schedules 30 generally determine ranges for the desired fuel flow for one type of reference fuel, for example JP4 jet fuel. The controller 26 also sends data to other systems for calculations and display on a display unit 32 which displays the received data, for example in the cabin of the aircraft (not shown). Such data may include, for example, the fuel mass flow, quantity of fuel burned and remaining quantity of fuel. The controller 26 further controls an ignition system 34 of the engine 10 upon start-up.

In order for the engine 10 to be able to function with fuel such as ethanol or an unknown mixture of ethanol and jet fuel, the fuel control system 22 includes a fuel mixture sensor 36 which is in line with the fuel injection system 20 (shown in FIG. 1) and which determines the general mixture between ethanol and jet fuel contained in the fuel supplied to the engine 10. The fuel mixture sensor 36 thus sends data on the composition of the mixture to the controller 26. The fuel control system 22 also includes an energy value evaluator 38 which determines an energy value of the fuel mixture, either directly by measurement or by reference to tables based on mixture ratios. In a particular embodiment, the energy value evaluator 38 determines the lower heating value (LHV) of the fuel mixture. The fuel control system 22 further includes a reference fuel table 40, which contains characteristics of the reference fuel in relation to the corresponding energy value. Such characteristics may include for example fuel mass flow required for various mixtures such that a specific LHV flow rate can be provided to the combustion system.

In use, at start-up of the engine 10, the controller 26 actuates the fuel mixture sensor 36 through a signal 50 and the fuel mixture sensor 36 determines the composition of the fuel supplied to the engine 10, i.e. the proportion of ethanol and jet fuel in the fuel. Alternately, the LHV of the fuel may be measured directly with an in line LHV sensor, providing directly the information desired. The fuel mixture sensor 36 then sends corresponding proportion data 52 to the controller 26. The controller 26 also actuates engine sensors 28 through a signal 54 and receives sensor data 56 therefrom, which includes for example the air mass flow and the pressure and temperature in the flow path at the end of the compressor section 14. In the case where a direct LHV sensor is implemented, the fuel mass flow required for a given engine inlet air mass flow can be directly calculated by the engine control system.

The controller 26 then sends data 58 to the energy value evaluator 38, the data 58 including the proportion of ethanol and jet fuel in the fuel and relevant sensor data. The energy value evaluator 38 determines the instantaneous LHV of the fuel mixture, for example from a database correlating the relevant sensor data and fuel proportion to the LHV. A given fuel mass flow of a particular fuel corresponds to a given amount of fuel energy (LHV*mass flow) that this fuel provides to the combustor. For example, the LHV of JP4 jet fuel is roughly about 18,000 BTU (British Thermal Units) per pound mass of the fuel, and thus at an exemplary fuel consumption rate of about 200 pounds of fuel flow per hour, the LHV input value to the combustor would be about 3.6 million BTU per hour. For the same engine condition using ethanol, for example, 3.6 million BTU per hour would still be required, however since ethanol has only about 60% of the energy content compared to JP4, the fuel mass flow rate of ethanol would need to be about 1.666 times as high as that for JP4, which in this example corresponds to about 366 pound of ethanol per hour. Once the instantaneous LHV of the fuel mixture has been determined by the energy value evaluator 38, the energy value evaluator 38 then sends the LHV 60 to the controller 26.

Alternately, the fuel mixture sensor 36 can directly determine the LHV as a means to determine the proportion of ethanol and jet fuel in the fuel, and in this case the data 52 sent by the fuel mixture sensor 36 to the controller 26 includes the LHV, and the energy value evaluator 38 is used during start-up. However, the proportion of ethanol to jet fuel need not be known if the LHV is measured direction as described above. In one embodiment, the LHV is determined specifically for the start up flow settings, as once the engine is running the LHV of the fuel can be determined using the measured temperatures and air mass flow rates of the engine. Thus, the specifically measured LHV values may not necessarily be needed once the engine has been started. By using the engine air mass flow, the air inlet and outlet temperatures, and the fuel mass flow rate, the instantaneous LVH values in the fuel can be determined. The plurality of instantaneous calculated LVH values are then held in a temporary memory register, and used by the control system to allow smooth control of the engine fuel flow for both steady state running and transient running. The value of LHV may be calculated once the engine is running every second or two, or alternately more or less often. Regardless, the general approach of establishing the LHV of the fuel before start is nonetheless desirable such that correct start-up flow rates can be set without fear of overheating during start or failing to start properly. The LHV values can then be periodically determined, from the engine parameters as described. The LHV before start is determined by establishing the mixture and then using a table or calculation method to determine LHV and then set the start flow based on this. Alternately, however, the LHV may be sensed directly, and the start fuel flow can then be set based on a direct knowledge of the LHV.

Regardless of how the LHV is determined, the controller 26 accesses the fuel schedules 30, as shown at 62, based on the sensor data, and retrieves corresponding fuel schedule data 64 related to start-up. The controller 26 then uses the LHV or the equivalent LHV and fuel proportions as described above, to adapt the fuel schedule data to the actual fuel used in the engine in order to determine a desired fuel flow and ignition settings.

The BTU input requirement to the engine is always predetermined by engine designers. The fuel flow rate is measured and controlled, and given that the LHV specifications of aircraft fuel must by regulations be within a specific narrow range, the need for LHV measurement or determination by the engine system never existed in the past.

The controller 26 then actuates the fuel metering device 24 through a signal 66 corresponding to the desired fuel flow, optionally receiving feedback 68 from the device 24. The controller 26 also actuates the ignition system 34 through a signal 70 corresponding to the ignition settings, optionally receiving a feedback 72 from the ignition system 34.

Once the engine 10 is lit, the controller 26 still receives the sensor data 56 from the engine sensors 28, which includes for example, fuel mass flow, air mass flow, temperature in the flow path at the end of the combustion section 16, etc. The controller 26 sends this data to the energy value evaluator 38, as shown at 58, which determines the corresponding instantaneous LHV of the fuel mixture. The LHV of the fuel input can be calculated by knowing the air mass flow and the temperature rise of that air mass when combustion occurs. This then provides the total BTU/hour of energy released by the fuel, and thus dividing by the fuel flow rate (in pounds per hour, for example) will provide the energy in the fuel in BTU per pound.

The energy value evaluator 38 sends the LHV 60 to the controller 26, which again accesses the fuel schedules 30, as shown at 62, based on the sensor data, and retrieves corresponding fuel schedule data 64 related to lit operation. The controller 26 uses the LHV to adapt the fuel schedule data to the actual fuel used in the engine in order to determine a desired fuel flow. As during start-up, the controller 26 then actuates the fuel metering device 24 through the signal 66 corresponding to the desired fuel flow.

The controller 26 thus regulates the operation of the fuel metering device 24 based on the LHV determined by the energy value evaluator 38. As the energy value evaluator 38 constantly calculates the LHV during the operation of the engine 10, the controller 26 reacts to variations in composition of the fuel and adjusts the fuel metering device 24 accordingly to optimize performance of the engine 10.

While the engine 10 is running, the controller 26 also accesses the reference fuel table 40, as shown at 74, and retrieves at least one reference characteristic 76 of the reference fuel corresponding to the LHV of the actual fuel used. For example, the controller 26 determines the corresponding mass flow of the reference fuel which would have been required to obtain the LHV obtained with the actual fuel and determined by the energy value evaluator 38. Based on the history of the operation of the engine 10, the controller 26 can also calculate an equivalent quantity of reference fuel burned. The controller 26 then sends normalized data 78, i.e. the equivalent characteristics of the reference fuel corresponding to the actual LHV of the fuel used, to the display unit 32, which displays it for the pilot. As such, the pilot can see the fuel data normalized to a reference fuel, i.e. as if the reference fuel was being used in the engine 10. The display unit 32 also provides the pilot with an indication of the real fuel quantity being used versus how much real fuel quantity is present in the fuel tanks. Accordingly, the actual fuel mass flow is measured and used for any information provided to the pilot. For example the mass flow and quantity of reference fuel corresponding to the actual operation of the engine can be displayed. Using this normalized data, standard calculations for range of the aircraft can be done by the pilot regardless if he/she is aware of the real composition of the fuel being used in the engine 10, thus eliminating errors due to confusion of fuel type used. This includes corrections of SG (specific gravity) which is also one of the parameters sensed, as the fuel level in the fuel tank may not be representative in terms of available range from one fuel to another, even if the BTU per Lb is known (i.e. the volume of fuel is what is provided by a level measurement device not the mass of fuel in the tank).

As such, the fuel control system 22 provides for control of the fuel metering device 24 adapted to a fuel which is a mixture of two different fuels with variable proportions, as well as normalisation of the operation of the engine to a known, reference fuel to facilitate operation of the engine. As such, the pilot can use the normalized data displayed to perform standard calculations such as range calculation without the need to verify the exact composition of the fuel.

Although in the preferred embodiment, the energy value used is the lower heating value or LHV, it is understood that other energy values can similarly be used. The above description is meant to be exemplary only, and one skilled in the art will recognize that changes may be made to the embodiments described without department from the scope of the invention disclosed. For example, the fuel control system 22 can be used with other configurations of gas turbine engines and with other types of engine. The reference fuel used can be any appropriate type of fuel. Still other modifications which fall within the scope of the present invention will be apparent to those skilled in the art, in light of a review of this disclosure, and such modifications are intended to fall within the appended claims.

What is claimed is:

1. A system for monitoring a flow of a liquid fuel mixture of different types of fuel in a gas turbine engine, the system comprising:
   a sensor sensing a proportion of each of the different types of fuel in the liquid fuel mixture;
   a unit determining a combustive energy value of the liquid fuel mixture in the engine from the proportions;
   a controller determining at least one equivalent characteristic of a reference fuel corresponding to the combustive energy value of the liquid fuel mixture; and
   a display unit displaying the at least one equivalent characteristic.

2. The system as defined in claim 1 wherein the combustive energy value is a lower heating value of the fuel mixture.

3. The system as defined in claim 1, wherein the at least one equivalent characteristic of the reference fuel includes an equivalent mass flow of the reference fuel.

4. The system as defined in claim 1, further comprising a reference fuel table listing the at least one equivalent characteristic of the reference fuel as a function of the combustive energy value, the controller determining the at least one equivalent characteristic of the reference fuel from the reference fuel table.

5. The system as defined in claim 1, wherein the unit is a sensor directly sensing the combustive energy value of the liquid fuel mixture.

6. The system as defined in claim 1, wherein the unit is an energy value evaluator calculating the combustive energy value from the proportion and from a known combustive energy value of each of the different types of fuel.

7. The system as defined in claim 1, further comprising sensors sensing an air mass flow in the gas turbine engine, a rise in temperature of the air mass during combustion, and a flow rate of the fuel mixture in the gas turbine engine to produce engine sensor data, and the unit is an energy value evaluator calculating the combustive energy value from the engine sensor data.

8. A control system for a liquid fuel mixture of different types of fuel in a gas turbine engine, the system comprising:
   a sensor sensing a proportion of each of the different types of fuel in the liquid fuel mixture;
   a unit determining a combustive energy value of the liquid fuel mixture in the engine from the proportions; and
   a controller extracting fuel schedule data from a fuel schedule established for a reference fuel, calculating a desired flow rate of the fuel mixture by adapting the fuel schedule data to the fuel mixture based on the combustive energy value, and outputting a signal adapted to control a fuel metering device of the gas turbine engine such as to conform a fuel mixture flow rate to the desired flow rate.

9. The system as defined in claim 8, wherein the controller also determines at least one equivalent characteristic of a reference fuel corresponding to the combustive energy value of the fuel, the system further comprising a display unit receiving and displaying the at least one characteristic of the reference fuel.

10. The system as defined in claim 9, further comprising a reference fuel table listing the at least one equivalent characteristic of the reference fuel as a function of the combustive energy value, the controller determining the at least one equivalent characteristic of the reference fuel from the reference fuel table.

11. The system as defined in claim 9, wherein the at least one equivalent characteristic of the reference fuel includes a mass flow of the reference fuel.

12. The system as defined in claim 8, wherein the desired fuel flow rate is a required fuel flow rate upon start up of the gas turbine engine, and the controller extracts start up fuel schedule data from the fuel schedule.

13. The system as defined in claim 12, wherein the unit is a sensor directly sensing the combustive energy value of the liquid fuel mixture.

14. The system as defined in claim 12, wherein the unit is an energy value evaluator calculating the combustive energy value from the proportion and from a known combustive energy value of each of the different types of fuel.

15. The system as defined in claim 8, further comprising engine sensors sensing temperature and pressure characteristics of the flow of the fuel mixture and of an air flow within the gas turbine engine to produce engine sensor data, and the controller extracts the fuel schedule data from the fuel schedule based on the engine sensor data.

16. The system as defined in claim 15, wherein the engine sensors also sense a flow rate of the air in the gas turbine engine, a rise in temperature of the air during combustion, and the liquid fuel mixture flow rate to produce additional engine sensor data, and the unit is an energy value evaluator calculating the combustive energy value from the additional engine sensor data.

17. The system as defined in claim 15, wherein the unit is a sensor directly sensing the combustive energy value of the liquid fuel mixture.

18. The system as defined in claim 15, further comprising a fuel sensor sensing a proportion of each of the different types of fuel in the liquid fuel mixture, and the unit is an energy value evaluator calculating the combustive energy value from the proportion and from a known combustive energy value of each of the different types of fuel.

19. The system as defined in claim 8, wherein the combustive energy value is the lower heating value.

* * * * *